(12) United States Patent
Eickhoff et al.

(10) Patent No.: US 6,472,631 B1
(45) Date of Patent: Oct. 29, 2002

(54) STRAIN RELIEF MECHANISM FOR A PLASMA ARC TORCH

(75) Inventors: Stephen T. Eickhoff, Hanover, NH (US); Ronald E. Morris, New London, NH (US)

(73) Assignee: Hypertherm, Inc., Hanover, NH (US)

( * ) Notice: Subject to any disclaimer, the term of this patent is extended or adjusted under 35 U.S.C. 154(b) by 6 days.

(21) Appl. No.: 09/849,446

(22) Filed: May 4, 2001

(51) Int. Cl.⁷ .............................. B23K 10/00; B23K 9/32
(52) U.S. Cl. .......................... 219/121.39; 219/137.31; 219/137.51; 219/121.48
(58) Field of Search .................. 219/121.39, 121.48, 219/121.36, 121.5, 121.52, 74, 75, 137.31, 137.63, 137.51

(56) References Cited

U.S. PATENT DOCUMENTS

| | | | |
|---|---|---|---|
| 5,219,285 A | | 6/1993 | Meller et al. ................ 433/126 |
| 5,338,917 A | * | 8/1994 | Stuart et al. ........... 219/137.63 |
| 5,380,980 A | * | 1/1995 | Colling ................. 219/137.31 |
| 5,717,802 A | | 2/1998 | Briggs et al. ................. 385/75 |
| 5,806,131 A | | 9/1998 | Tennant ................... 15/230.11 |
| 5,841,105 A | * | 11/1998 | Haczynski et al. .... 219/137.31 |
| 6,078,023 A | * | 6/2000 | Jones et al. ............ 219/137.63 |

OTHER PUBLICATIONS

SKINTOP® II Liquid Tight Strain Relief Cord Connectors brochure (pp. 113–115).
SKINTOP® II–CR Chemical Resistant, Non–Metallic Strain Relief Cord Connectors, brochure.
Heyco® Products, Inc., catalog pages (pp. 1–14–1–19).

\* cited by examiner

*Primary Examiner*—Mark Paschall
(74) *Attorney, Agent, or Firm*—Testa, Hurwitz & Thibeault, LLP (57) ABSTRACT

The present invention relates to a strain relief mechanism for a plasma arc torch. In particular, the invention relates to a strain relief system including a positive axial restraint component for restraining axial movement of a lead relative to a housing and a positive rotational restraint component for restraining rotational movement of the lead relative to the housing, wherein the positive axial restraint component and the positive rotational restraint component are independent components arranged in a spaced relationship relative to each other.

33 Claims, 6 Drawing Sheets

STRAIN RELIEF MECHANISM FOR A PLASMA ARC TORCH

FIELD OF THE INVENTION

The invention relates to a strain relief mechanism for a tool. In particular, the invention relates to a strain relief mechanism for a plasma arc torch which includes a positive axial restraint component and a positive rotational restraint component.

BACKGROUND OF THE INVENTION

Plasma arc torches are widely used in the cutting or marking of metallic materials. A plasma torch generally includes an electrode and a nozzle having a central exit orifice mounted within a torch body, electrical connections, passages for cooling and arc control fluids, a swirl ring to control fluid flow patterns in the plasma chamber formed between the electrode and nozzle, and a power supply. The torch produces a plasma arc, which is a constricted ionized jet of a gas with high temperature and high momentum. Gases used in the torch can be non-reactive (e.g. argon or nitrogen), or reactive (e.g. oxygen or air).

In operation, a pilot arc is first generated between the electrode (cathode) and the nozzle (anode). Generation of the pilot arc may be by means of a high frequency, high voltage signal coupled to a DC power supply and the torch or any of a variety of contact starting methods.

One known configuration of a plasma arc torch includes one or more leads connecting the torch to the power supply to provide the torch with electrical current and gas. The connection of the lead(s) to the power supply must be rugged to handle the strain placed on the lead as it is manipulated in order to place the plasma arc torch in a position to cut or mark a workpiece. While most operators of hand-held systems use the plasma arc torch, lead and power supply properly, some operators have used the lead for purposes not intended by the manufacturer (e.g. stepping on the lead(s) or even pulling the lead(s) to drag the power supply to a new location).

The lead(s) used to connect the torch to the power supply can be a single integral lead having a gas hose located in the middle of the lead and electrical conductors and fillers arranged symmetrically around the gas hose. A jacket material is extruded over the gas hose, electrical conductors and fillers. A strain relief mechanism can be attached to the jacket to handle loads applied to the lead. The jacket, gas hose, electrical conductors and fillers are anchored together over a barb-type fitting. A clamp, which acts as the strain relief mechanism, is applied to grab and hold the jacket to prevent relative axial motion (or twisting) of the lead components. The stress through the lead is absorbed by the clamp and transferred to the chassis of the power supply through a mechanical connection.

One example of an integral lead with a clamp which prevents axial motion or twisting of lead components is found in the lead used in the PMX900/PAC125 plasma arc torch system manufactured by Hypertherm, Inc. The lead used in this plasma arc torch system is connected to the power supply by a threaded quick disconnect connector. A quick disconnect connector is advantageous in that it simplifies torch removal but is expensive to make. Another example of an integral lead with a clamp for preventing axial motion (or twisting) of lead components can be found in the lead used in the PMX600/PAC123 plasma arc torch system manufactured by Hypertherm, Inc. In this system, stress is absorbed by the chassis of the power supply through a tool-tightened nut. A tool-tightened nut is advantageous in that it is inexpensive, but the tool-tightened nut requires the use of a tool. The use of a tool can be time consuming, and the tool can be easily misplaced.

It is therefore an object of the present invention to provide an improved and inexpensive axial and rotational strain relief mechanism for connecting a lead to a plasma arc torch power supply.

SUMMARY OF THE INVENTION

In one aspect, the invention features a strain relief system for restraining a lead relative to a housing. The strain relief system includes a positive axial restraint component for restraining axial movement of the lead relative to the housing and a positive rotational restraint component for restraining rotational movement of the lead relative to the housing. The positive axial restraint component and the positive rotational restraint component are independent components arranged in a spaced relationship relative to each other. In one embodiment, the positive axial restraint component comprises a quick disconnect connector and the positive rotational restraint component comprises a shaped boot attached to the lead.

In another aspect, the invention features a plasma arc torch for piercing or cutting a workpiece. The plasma arc torch includes a torch body, a power supply, a lead with two ends. The first end of the lead is connected to the torch body, and the second end of the lead is attached to a strain relief system to couple the lead to the power supply. The strain relief system includes a positive axial restraint component for restraining axial movement of the lead relative to the power supply and a positive rotational restraint component for restraining rotational movement of the lead relative to the power supply. The positive axial restraint component and the positive rotational restraint component are independent components arranged in a spaced relationship relative to each other.

In another aspect, the invention features a method for restraining a lead relative to a housing. The method includes the steps of providing a positive axial restraint component for restraining axial movement of the lead relative to the housing, and providing a positive rotational restraint for restraining rotational movement of the lead relative to the housing, and connecting the lead to the housing. The positive axial restraint component and the positive rotational restraint component are independent components arranged in a spaced relationship relative to each other.

In yet another aspect, the invention features a method for restraining a lead relative to a power supply for a plasma arc torch. The method includes the steps of providing a positive axial restraint component for restraining axial movement of the lead relative to the power supply and providing a positive rotational restraint component for restraining rotational movement of the lead relative to the power supply. The positive axial restraint component and the positive rotational restraint component are independent components. The method also includes the step of arranging the positive axial restraint component and the positive rotational restraint component in a spaced relationship relative to each other along a longitudinal axis of the lead. Further, the method includes the step of connecting the lead to the power supply for the plasma arc torch.

DETAILED DESCRIPTION OF THE INVENTION

Figure 1:
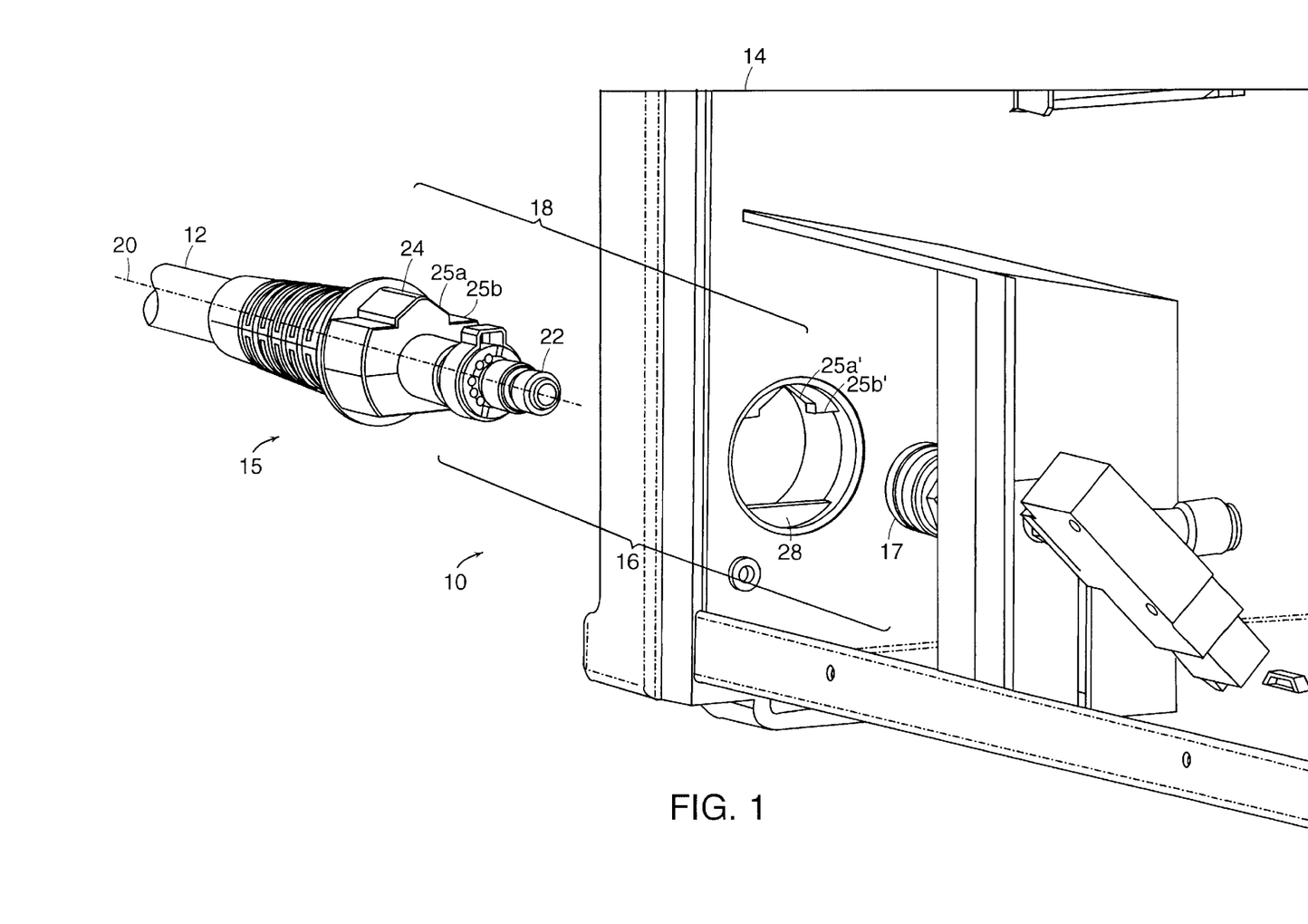
FIG. 1 is a diagram of a strain relief system used to connect a lead to a housing.

FIG. 1 illustrates a strain relief system which connects a lead to a housing. The strain relief system 10 prevents axial movement and rotational displacement of the lead 12 relative to the housing 14. The strain relief system 10 includes a positive axial restraint component 16 for restraining axial movement of the lead 12 relative to the housing 14 and a positive rotational restraint component 18 for restraining rotational movement of the lead 12 relative to the housing 14. The positive axial restraint component 16 and the positive rotational restraint component 18 are independent components arranged in a spaced relationship relative to each other.

In one embodiment, the positive axial restraint component 16 can include a quick disconnect connector 22 attached to the lead 12. In another embodiment, the positive axial restraint component 16 can include the quick disconnect connector 22 and a quick disconnect connector receptacle 17 positioned inside the housing 14.

In one embodiment, the positive rotational restraint component 18 can include a shaped boot 24 attached to the lead 12. In another embodiment, the positive rotational restraint component 18 can include the shaped boot 24 and a mating receptacle 28 formed in the housing 14. The shaped boot 24 and the mating receptacle 28 are designed to prevent rotation of the lead 12 when the shaped boot 24 is inserted in the mating receptacle 28. The shaped boot 24 and mating receptacle 28 are designed to have anti-rotation features 25a, 25b, 25a', and 25b' to prevent rotation of the lead 12 relative to the housing 14.

The positive axial restraint component 16 and the positive rotational restraint component 18 are arranged in a spaced relationship relative to a longitudinal axis 20 of the lead 12. In addition, the positive axial restraint component 16 and the positive rotational restraint component 18 can be configured so that both are engaged simultaneously when the lead 12 is connected to the housing 14.

Generally, the strain relief system 10 can be useful in a variety of tools. However, it has been found that the strain relief system described herein is particularly useful in a plasma arc torch system.

Figure 2:
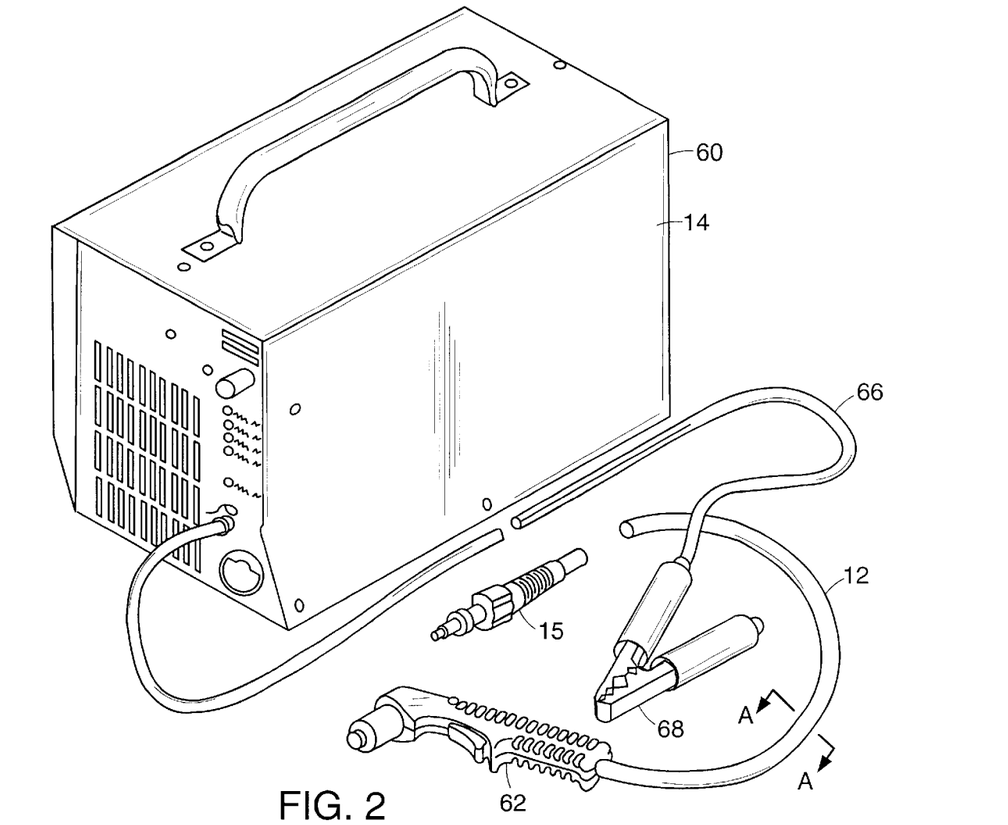
FIG. 2 is a diagram of a plasma arc torch power supply, lead and a torch body used for cutting or piercing a metal workpiece.

FIG. 2 illustrates a plasma arc torch system representative of any of a variety of models of torch systems. A power supply 60 provides continuously variable current output within a range (e.g. from about 20 to 40 amperes). This range can be lower or higher depending on the torch system, the thickness the workpiece and the desired cutting speeds. The variable power supply allows for wide variations in cutting speeds for a given thickness of metal.

A torch body 62 configured for hand cutting is connected to the power supply 60 by a lead 12. The power supply 60 is enclosed by housing 14. The lead 12 is connected to the power supply 60 by a strain relief system 15. The lead 12 provides the torch body 62 with a plasma gas from a gas source (not shown) and electrical power from the power supply 60 to ignite and sustain a plasma stream. In one embodiment, air is used as the plasma gas, but other gases can be used to improve cut quality on metals such as stainless steel and aluminum. A workpiece lead 66 provides a return path for the current generated by the power supply 60 and is typically connected to a workpiece (not shown) by a clamp 68.

Figure 3:
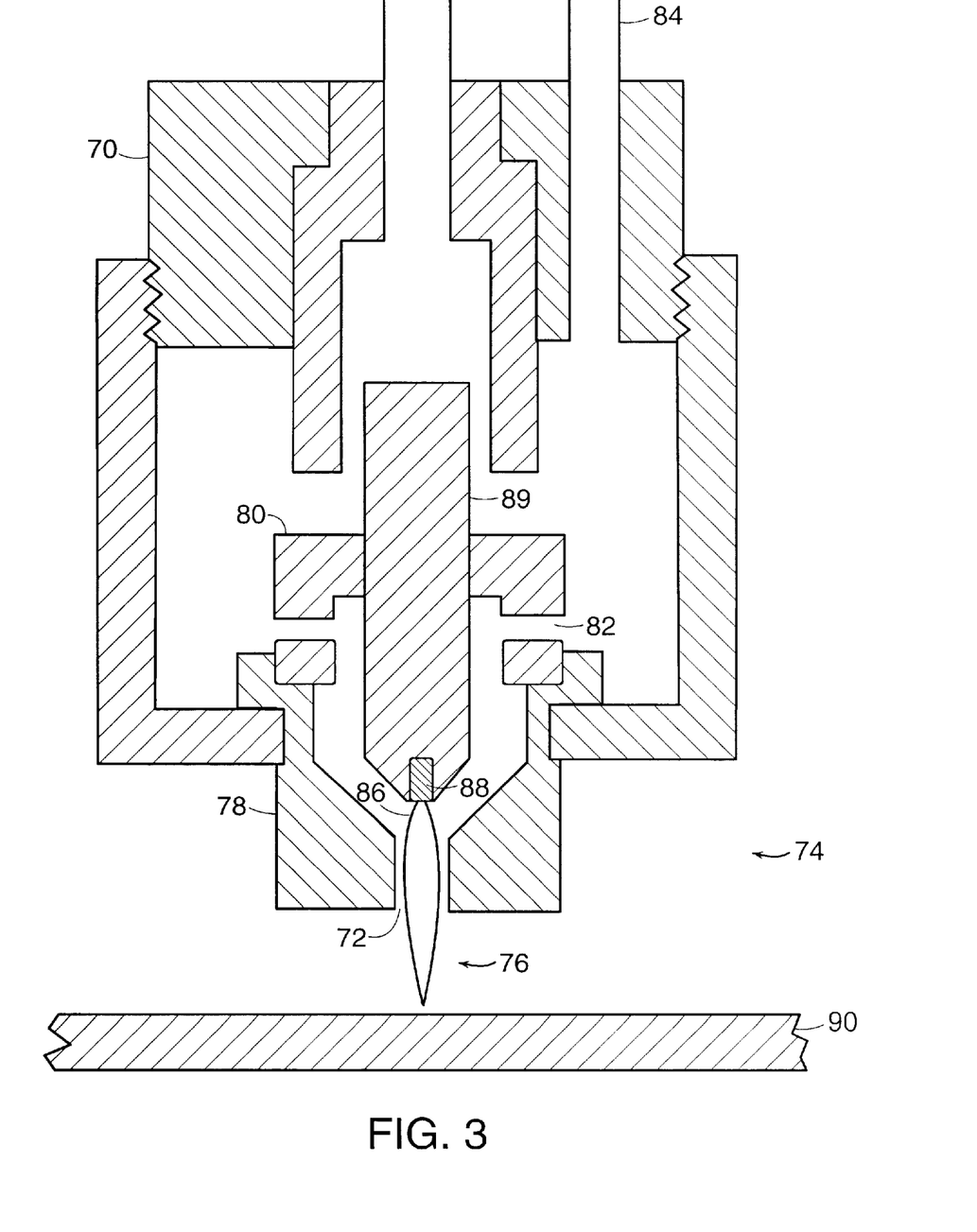
FIG. 3 is a schematic cross-sectional view of a conventional plasma arc torch.

FIG. 3 illustrates in simplified schematic form a plasma arc torch representative of any of a variety of models of torches. The torch has a body 70 which is generally cylindrical with an exit orifice 72 at a lower end 74. A plasma arc 76, i.e. an ionized gas jet, passes through the exit orifice 72. The torch is used to pierce and cut metal, such as mild steel or other electrically-conducting materials, in a transferred arc mode. In cutting mild steel, the torch operates with a reactive gas, such as oxygen or air, or a non-reactive gas, such as nitrogen or argon, as the plasma gas to form the transferred plasma arc.

The torch body 70 supports an electrode 89 having an insert 88 in its lower end and a nozzle 78 spaced from the electrode 89. The nozzle 78 has a central orifice that defines the exit orifice 72. A swirl ring 80 is mounted to the torch body 70. In one embodiment, the swirl ring 80 has a set of radially offset (or canted) gas distribution holes 82 that impart a tangential velocity component to the plasma gas flow causing it to swirl. This swirl creates a vortex that constricts the arc and stabilizes the position of the arc on the insert.

In operation, the plasma gas flows through a gas inlet tube 84 and the gas distribution holes 82. The gas flows into the plasma chamber 86 and out of the torch through the exit orifice 72. A pilot arc, which ionizes the gas passing through the exit orifice, is first generated between the electrode 88 and the nozzle 78. The arc then transfers from the nozzle to a workpiece 90. It is noted that the particular construction details of the torch body, including the arrangement of components directing of gas and cooling fluid flows and providing electrical connects, can take a wide variety of forms.

When repairing or replacing the torch head 74 or lead 12, it is important that the lead connected between the torch and the power supply can be disconnected from the power supply. In addition, operators often wish to disconnect the torch from the power supply for convenience during storage or transport of the system.

Figure 4:
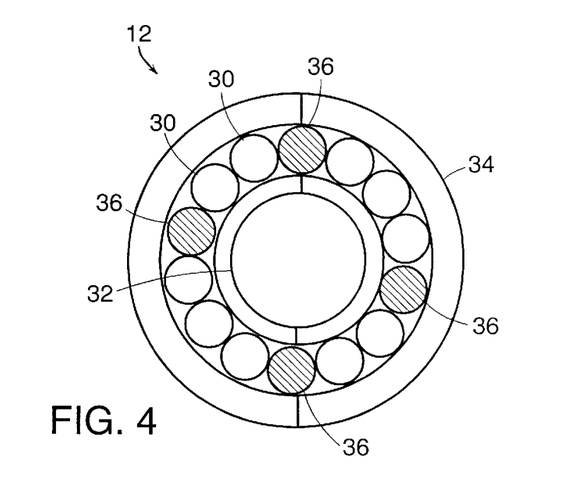
FIG. 4 is a cross-section view of the lead from FIG. 2.

FIG. 4 illustrates a cross-section of the lead 12 (Section A—A from FIG. 2) used to supply current and gas to the torch body 62. The lead 12 has wires 30 for delivery of current from the power supply 60 to the torch body 62. In addition, a hose 32 delivers gas from the power supply to the torch body. In one embodiment, the hose 32 is centrally located within the lead 12. In another embodiment, the hose 32 is not located in the center of lead 12. In still another embodiment, there can be more than one hose 32 in lead 12.

The wires 30 and hose 32 are located inside of a jacket 34. Fillers 36 are disposed in remaining spaces inside the jacket 34 to provide support and fill in empty space.

Figure 5:
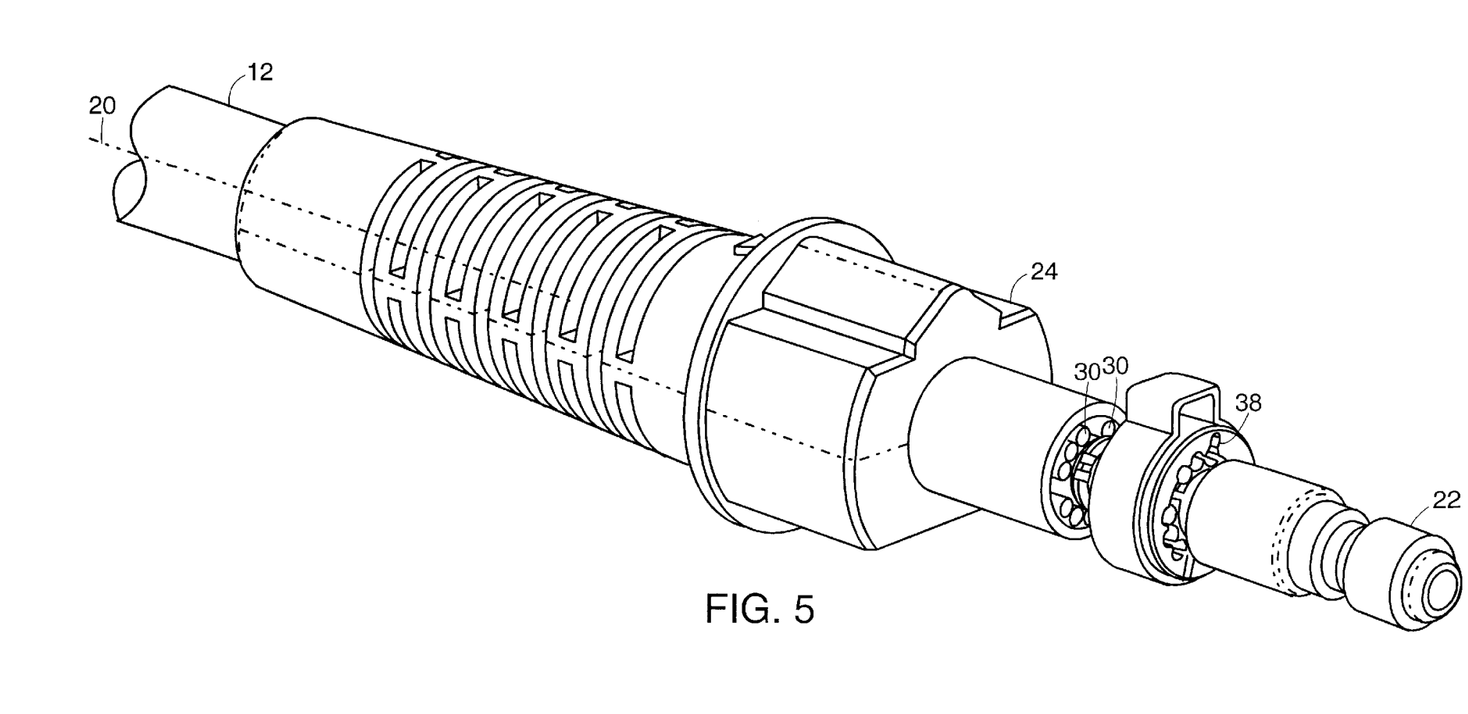
FIG. 5 is a diagram of a lead, shaped boot, and quick disconnect connector.

FIG. 5 illustrates the lead 12 and the shaped boot 24. The lead 12 also includes a quick disconnect connector 22. The quick disconnect connector 22 can be connected to the quick disconnect connector receptacle 17, which in one embodiment is secured within the housing 14 (FIG. 1) of the power supply 60. The quick disconnect connector 22 also functions as a gas fitting to allow gas or fluid to be transferred from the power supply 60 to the torch body 62 via lead 12. Wires 30 can extend through holes 38 to connect the wires 30 with an electrical connector in the power supply 60 (FIG. 6).

Figure 6:
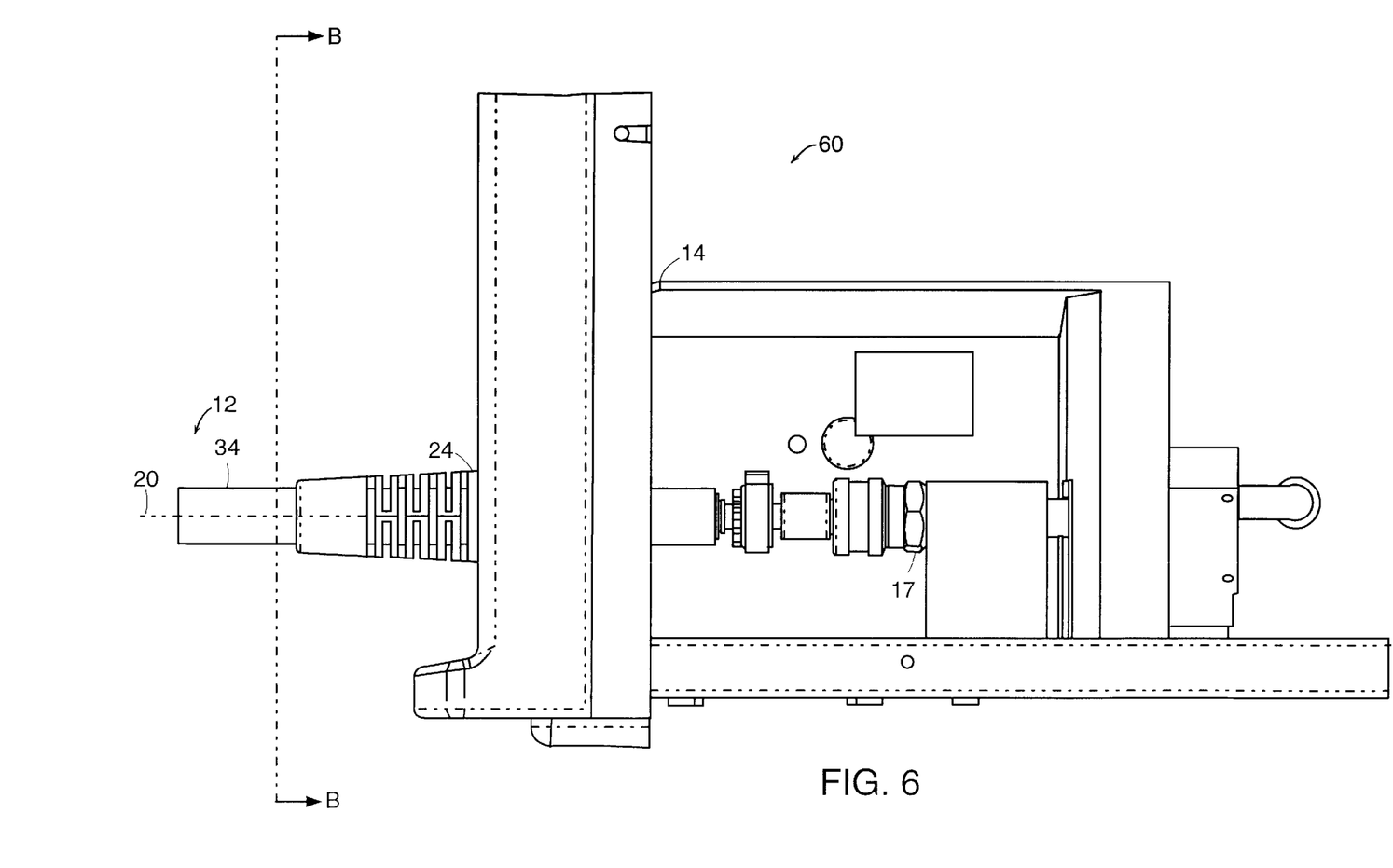
FIG. 6 is a diagram of a lead attached to a plasma arc torch power supply.

FIG. 6 illustrates the portion of the lead 12 connected to the power supply 60. The lead 12 has a longitudinal axis 20. The lead further includes the shaped boot 24 molded over the jacket 34. The mating receptacle 28 and shaped boot 24 are both compatibly shaped to allow the shaped boot 24 to fit securely within the mating receptacle 28 and have anti-rotation features 25a, 25b, 25a' and 25b' to prevent rotation of the lead 12 relative to the housing 14.

Figure 7:
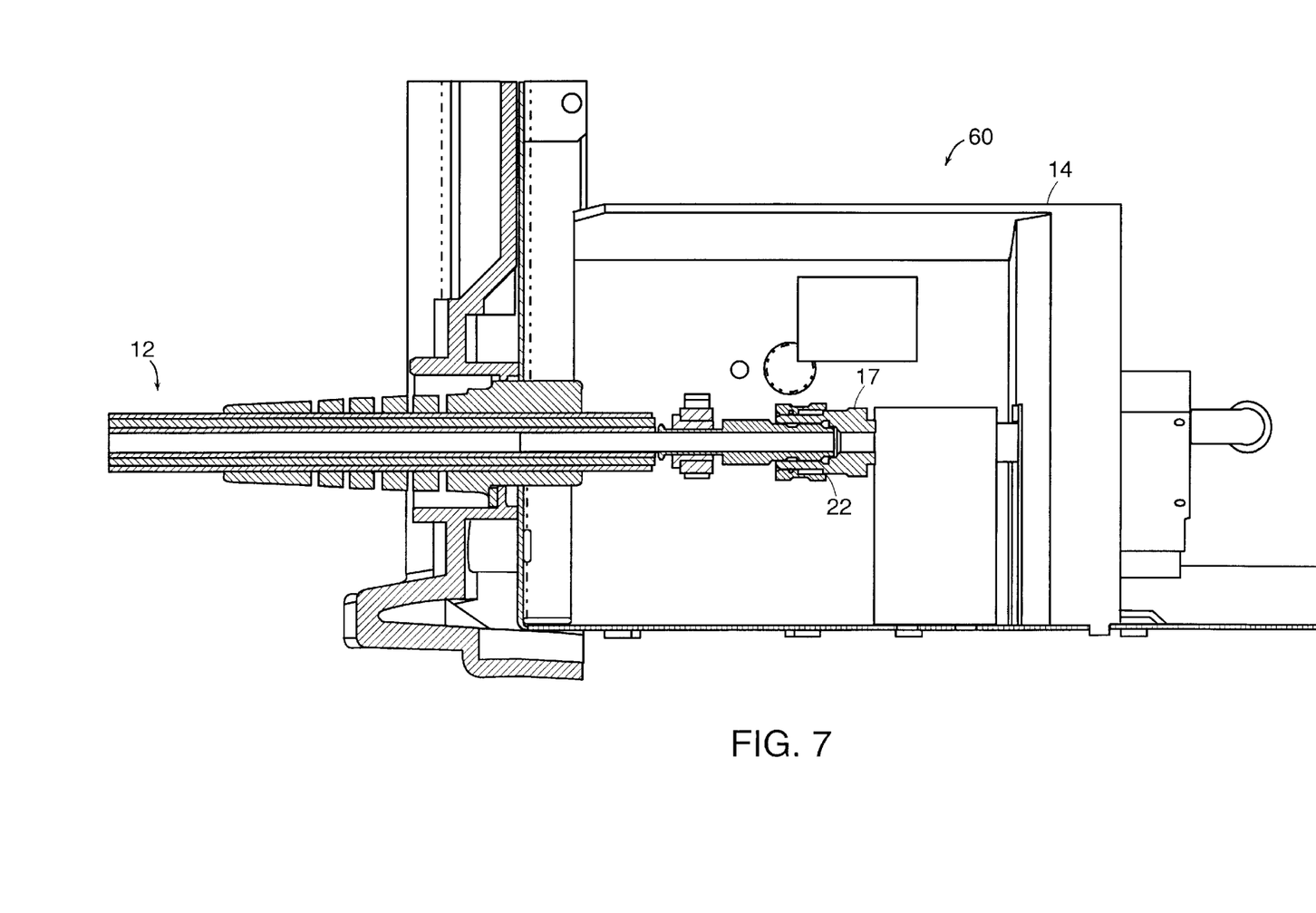
FIG. 7 is a cross-section along a longitudinal axis of the lead attached to the plasma arc torch power supply from FIG. 6.

As shown in FIG. 6, the lead 12 is connected to the quick disconnect connector receptacle 17 located in the housing 14 of power supply 60. FIG. 7 is a cross-section (Section B—B from FIG. 6) taken perpendicular to the longitudinal axis 20 of lead 12 and illustrates the connection of lead 12 to the quick disconnect connector receptacle 17. The embodiment shown uses the quick disconnect connector receptacle 17, which engages the quick disconnect connector 22. The quick disconnect connector 22 also acts as gas fitting, allowing gas or fluid to be supplied with the lead 12 from the power supply to the torch body 62. The foregoing are merely representative embodiments, as other configurations are possible and within the scope of the inventions.

EQUIVALENTS

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A strain relief system for restraining a lead relative to a housing, the system comprising:
   (a) a positive axial restraint component for restraining axial movement of the lead relative to the housing; and
   (b) a positive rotational restraint component for restraining rotational movement of the lead relative to the housing, wherein the positive axial restraint component and the positive rotational restraint component are independent components arranged in a spaced relationship relative to each other.

2. The strain relief system of claim 1 wherein the positive axial restraint component and the positive rotational restraint component are arranged in a spaced relationship relative to a longitudinal axis of the lead.

3. The strain relief system of claim 1 wherein the positive axial restraint component and the positive rotational restraint component are configured so that both are engaged simultaneously when the lead is connected to the housing.

4. The strain relief system of claim 1 wherein the positive axial restraint component comprises a quick disconnect connector.

5. The strain relief system of claim 4 wherein the positive axial restraint component further comprises a quick disconnect connector receptacle.

6. The strain relief system of claim 1 wherein the positive rotational restraint component comprises a shaped boot attached to the lead.

7. The strain relief system of claim 6 wherein the positive rotational restraint component further comprises a mating receptacle in the housing for accepting the shaped boot.

8. The strain relief system of claim 1 wherein the positive axial restraint component comprises a quick disconnect connector and the positive rotational restraint component comprises a shaped boot attached to the lead.

9. The strain relief system of claim 1 wherein the lead comprises a fluid line and at least one electrical conductor.

10. The strain relief system of claim 9 further comprising an electrical connection connecting the at least one electrical conductor with a mating connector in the housing.

11. The strain relief system of claim 9 wherein the fluid line is generally centrally disposed in the lead and the at least one electrical conductor is disposed radially outwardly therefrom.

12. A plasma arc torch for piercing or cutting a workpiece, the torch comprising:
    a torch body;
    a power supply;
    a lead comprising a first end connected to the torch body and a second end; and
    a strain relief system to couple the second end of the lead to the power supply,
    wherein the strain relief system comprises:
    (a) a positive axial restraint component for restraining axial movement of the lead relative to the power supply; and
    (b) a positive rotational restraint component for restraining rotational movement of the lead relative to the power supply, wherein the positive axial restraint component and the positive rotational restraint component are independent components arranged in a spaced relationship relative to each other.

13. The torch of claim 12 wherein the positive axial restraint component and the positive rotational restraint component are arranged in a spaced relationship relative to a longitudinal axis of the lead.

14. The torch of claim 12 wherein the positive axial restraint component and the positive rotational restraint component are configured so that both are engaged simultaneously when the lead is connected to the power supply.

15. The torch of claim 12 wherein the positive axial restraint component comprises a quick disconnect connector.

16. The torch of claim 15 wherein the positive axial restraint component further comprises a quick disconnect connector receptacle.

17. The torch of claim 12 wherein the positive rotational restraint component comprises a shaped boot attached to the lead.

18. The torch of claim 17 wherein the positive rotational restraint component further comprises a mating receptacle in the power supply for accepting the shaped boot.

19. The torch of claim 12 wherein the positive axial restraint component comprises a quick disconnect connector and the positive rotational restraint component comprises a shaped boot attached to the lead.

20. The torch of claim 12 wherein the lead comprises a fluid line and at least one electrical conductor.

21. The torch of claim 20 further comprising an electrical connection connecting the at least one electrical conductor with a mating connector in the power supply.

22. The torch of claim 20 wherein the fluid line is generally centrally disposed in the lead and the at least one electrical conductor is disposed radially outwardly therefrom.

23. A method for restraining a lead relative to a housing, the method comprising the steps of:
    (a) providing a positive axial restraint component for restraining axial movement of the lead relative to the housing;

(b) providing a positive rotational restraint component for restraining rotational movement of the lead relative to the housing, wherein the positive axial restraint component and the positive rotational restraint component are independent components arranged in a spaced relationship relative to each other; and (c) connecting the lead to the housing.

24. The method of claim 23 wherein the positive axial restraint component and the positive rotational restraint component are arranged in a spaced relationship relative to a longitudinal axis of the lead.

25. The method of claim 23 wherein the positive axial restraint component and the positive rotational restraint component are configured so that both are engaged simultaneously when the lead is connected to the housing.

26. The method of claim 23 wherein the positive axial restraint component comprises a quick disconnect connector.

27. The method of claim 26 wherein the positive axial restraint component further comprises a quick disconnect connector receptacle.

28. The method of claim 23 wherein the positive rotational restraint component comprises a shaped boot attached to the lead.

29. The method of claim 28 wherein the positive rotational restraint component further comprises a mating receptacle in the housing for accepting the shaped boot.

30. The method of claim 23 wherein the lead comprises a fluid line and at least one electrical conductor.

31. The method of claim 30 wherein the fluid line is generally centrally disposed in the lead and the at least one electrical conductor is disposed radially outwardly therefrom.

32. The method of claim 30 wherein the method further comprises the step of a (d) connecting the at least one electrical conductor to a mating connector in the housing.

33. A method for restraining a lead relative to a power supply for a plasma arc torch, the method comprising the steps of:

(a) providing a positive axial restraint component for restraining axial movement of the lead relative to the power supply for the plasma arc torch and a positive rotational restraint component for restraining rotational movement of the lead relative to the power supply for the plasma arc torch, wherein the positive axial restraint component and the positive rotational restraint component are independent components;

(b) arranging the positive axial restraint component and the positive rotational restraint component in a spaced relationship relative to each other along a longitudinal axis of the lead; and (c) connecting the lead to the power supply for the plasma arc torch.

* * * * *